Feb. 17, 1925.

E. J. GARVIN ET AL 1,527,041

APPARATUS FOR MAKING CEMENT BLOCKS

Filed Nov. 26, 1923

5 Sheets-Sheet 1

Inventor
E. J. GARVIN
WALTER BARTOL

By

Attorney

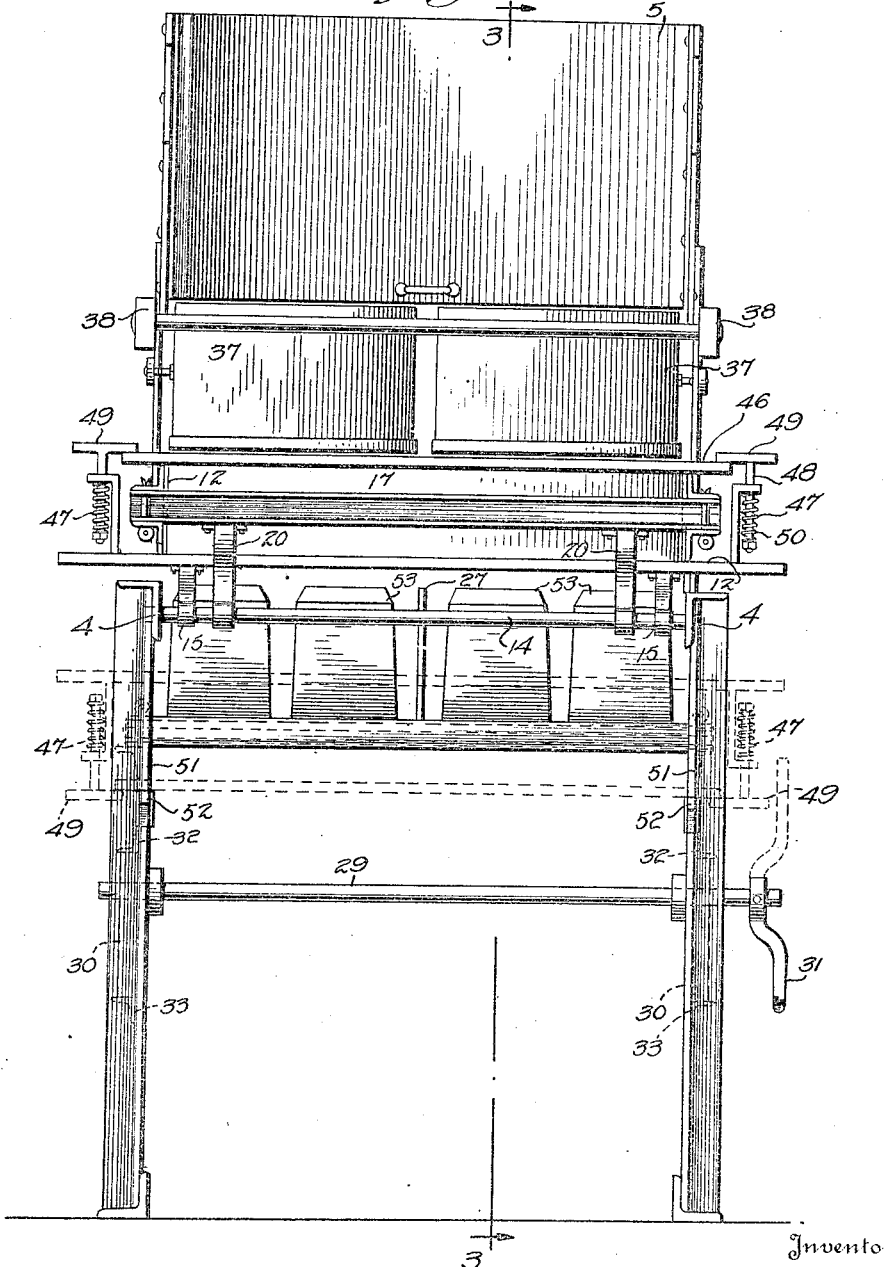

Feb. 17, 1925. 1,527,041
E. J. GARVIN ET AL
APPARATUS FOR MAKING CEMENT BLOCKS
Filed Nov. 26, 1923 5 Sheets-Sheet 3

Inventor
E. J. GARVIN
WALTER T. BARTOL
By
Attorney

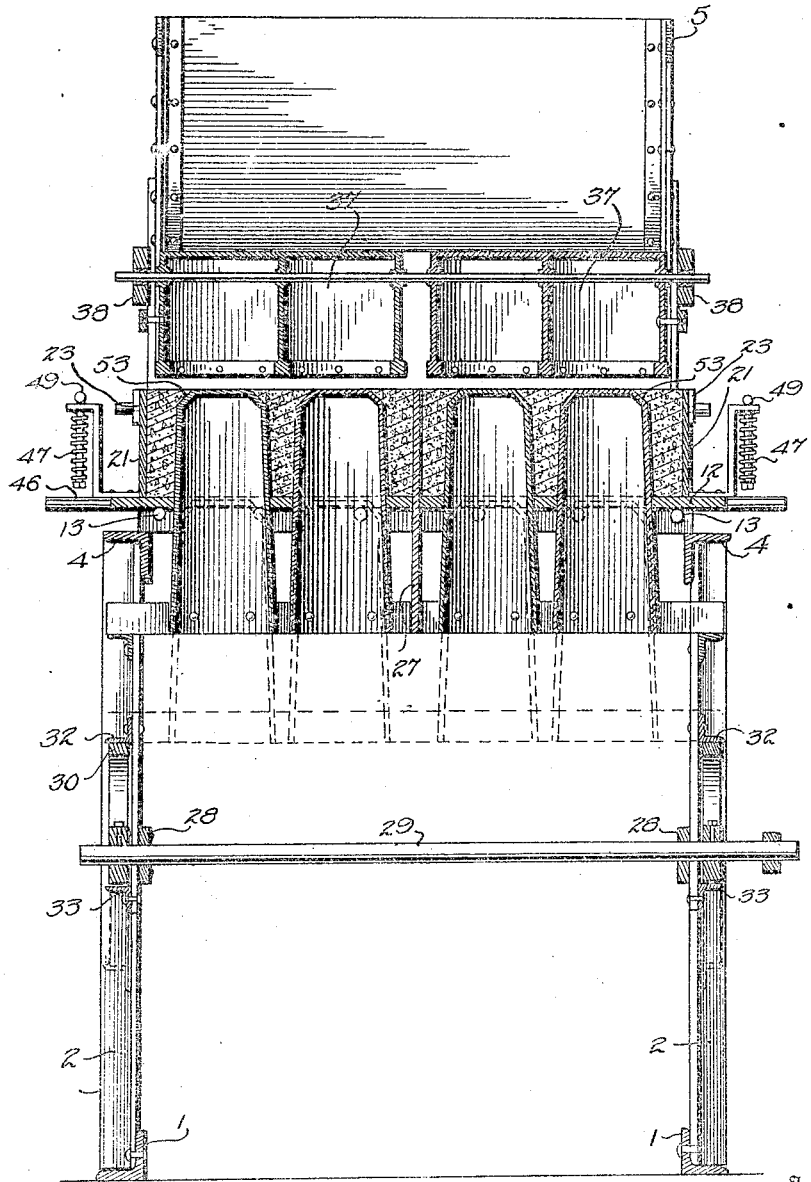

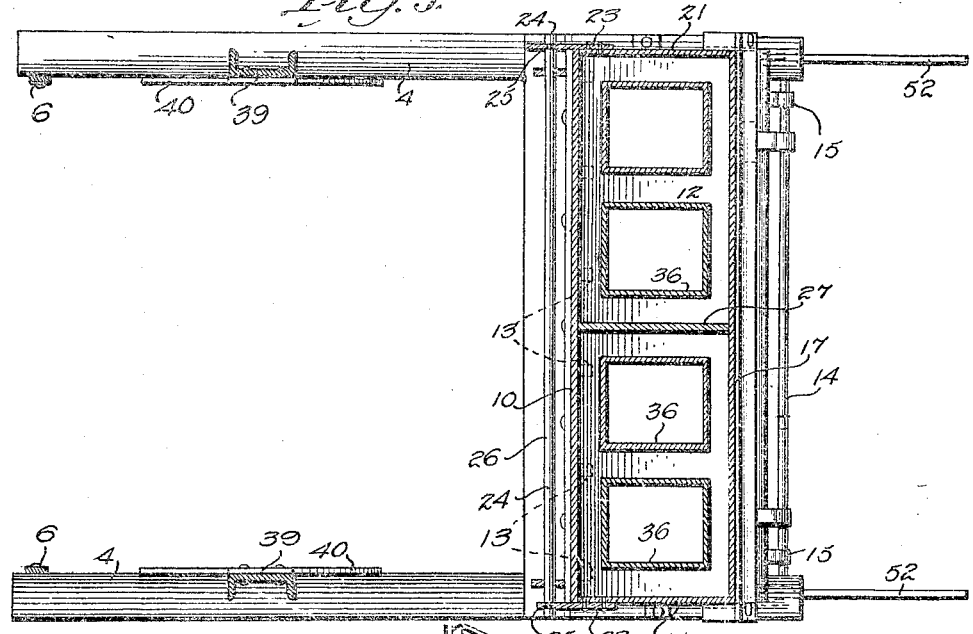
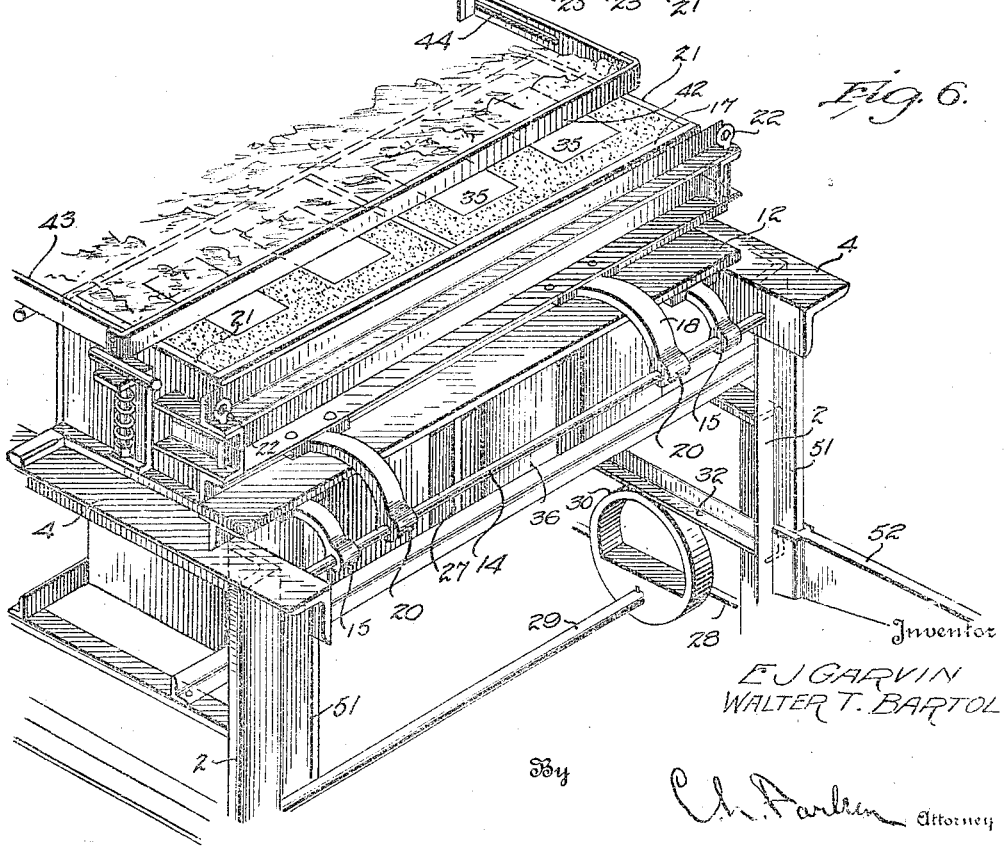

Patented Feb. 17, 1925.

1,527,041

UNITED STATES PATENT OFFICE.

EDWARD J. GARVIN AND WALTER T. BARTOL, OF PHOENIX, ARIZONA.

APPARATUS FOR MAKING CEMENT BLOCKS.

Application filed November 26, 1923. Serial No. 677,064.

*To all whom it may concern:*

Be it known that we, EDWARD J. GARVIN and WALTER T. BARTOL, citizens of the United States, residing at Phoenix, in the county of Maricopa and State of Arizona, have invented certain new and useful Improvements in Apparatus for Making Cement Blocks, of which the following is a specification.

This invention relates to apparatus for making cement blocks.

An object of the invention is the provision of a machine for manufacturing cement blocks in which cores of different shapes and sizes may be inserted to form blocks of the desired type and size.

A further object is the provision of a machine for rapidly and efficiently molding cement blocks without the use of power or hand tools.

Figure 1:
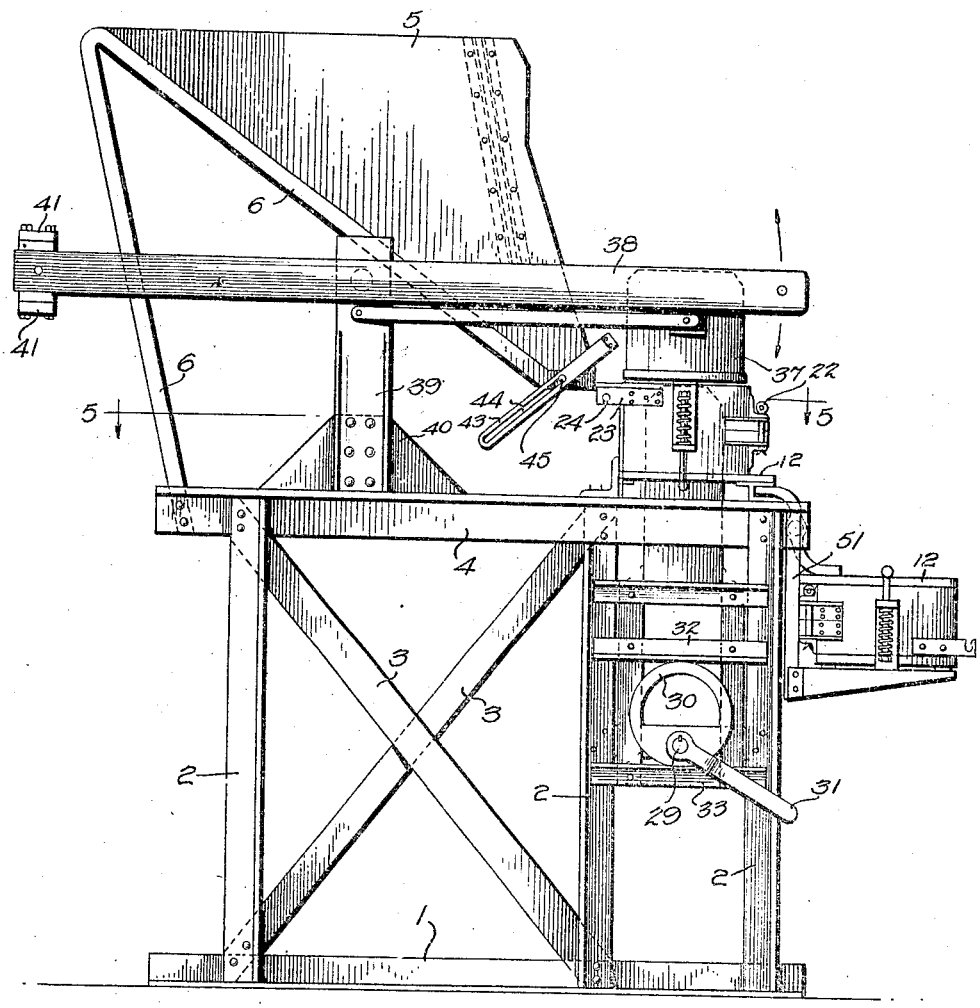
Figure 7:
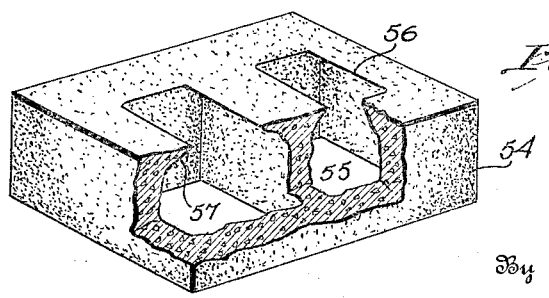
Figure 3:
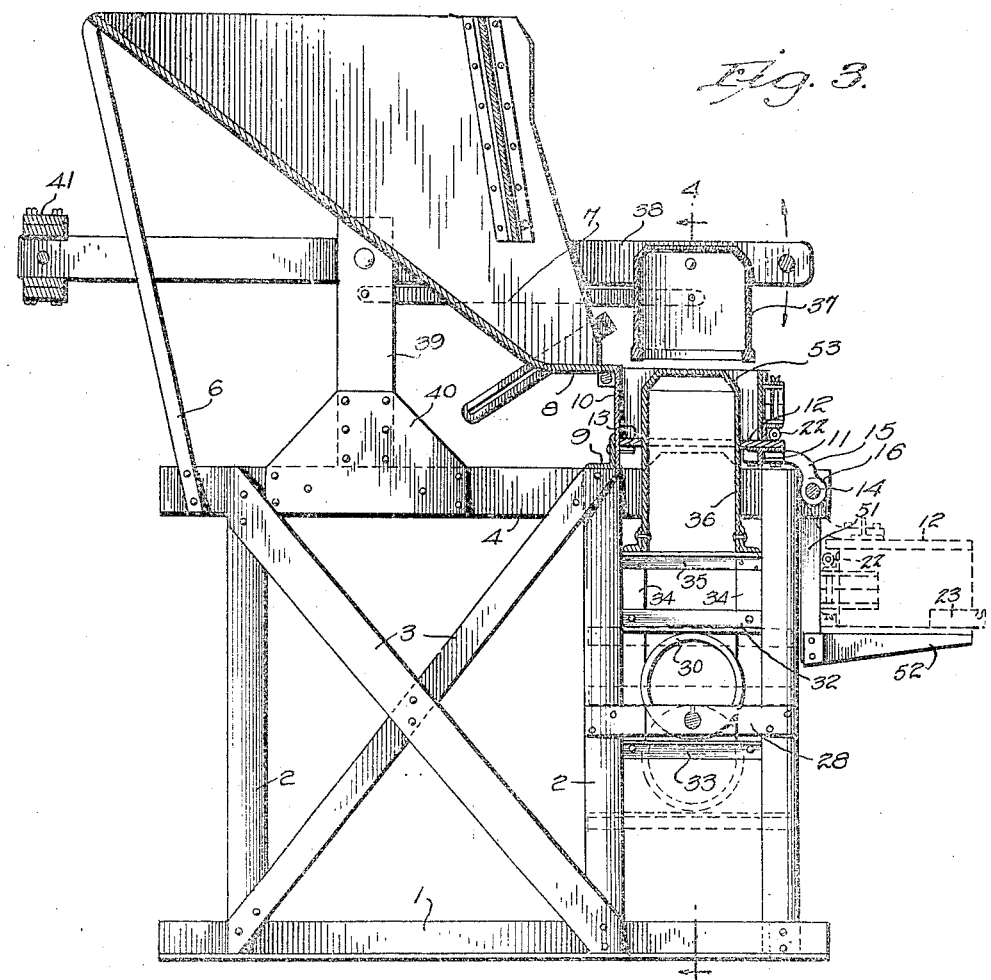
Figures 8, 9, 10:
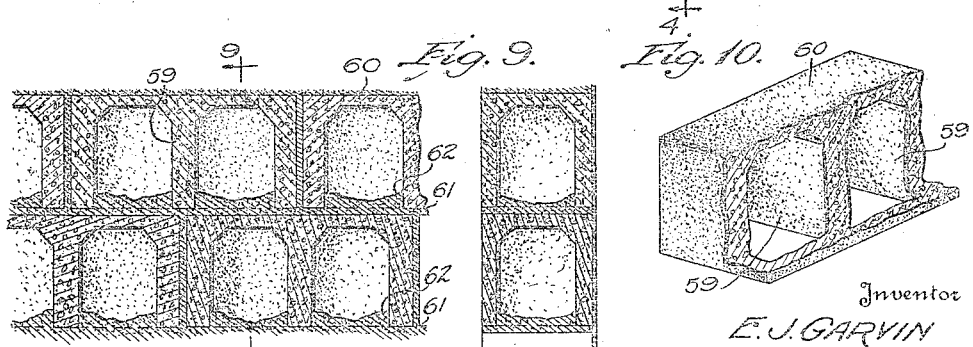

In the accompanying drawings, we have shown one embodiment of the invention. In this showing:

Figure 1 is a side elevation,
Figure 2 is a front elevation,
Figure 3 is a vertical sectional view on line 3—3 of Figure 2,
Figure 4 is a vertical sectional view on line 4—4 of Figure 3,
Figure 5 is a horizontal sectional view on line 5—5 of Figure 1,
Figure 6 is a perspective view of a portion of the apparatus,
Figure 7 is a perspective view of a cement block, parts being broken away,
Figure 8 is a vertical sectional view of a wall formed of cement blocks in which the vents are entirely closed at the top,
Figure 9 is a vertical sectional view on line 9—9 of Figure 8, and,
Figure 10 is a perspective view of one of the blocks shown in Figures 8 and 9, parts being broken away.

Referring to the drawings, the reference numeral 1 designates the base of the machine consisting of a pair of spaced rods arranged at opposite sides and extending from the front to the rear. A plurality of standards 2 are secured to the base on each side and suitable diagonal braces 3 may be arranged between the standards. The upper ends of the standards are connected by side members 4. A hopper 5 is arranged above the side members and is supported therefrom by means of a suitable bracket 6. The hopper is open at the top to permit the mixed batch to be inserted therein and is provided with a gate or opening 7 at the bottom. The hopper is provided with a horizontally arranged apron 8 at its forward end adjacent the gate to permit the material to be fed into the molds.

Adjacent the front of the mixing apparatus, there is provided a transverse angle iron 9, the ends of which are secured to the side members 4 and this transverse angle iron forms a support for an upright member 10, which serves as the back of the mold. A T-shaped beam 11 is arranged in front of the angle iron and spaced therefrom.

The mold consists of a bottom 12 adapted to rest upon the T-shaped beam 11 at the front, and being supported by means of pins 13 carried by the angle iron 9 at the rear. The bottom of the mold is pivotally mounted on a shaft 14 by means of arms 15 which are secured thereto and which are provided with sleeves 16 on their outer ends surrounding the shaft. The mold is provided with a front 17, which is also pivotally mounted on the shaft 14. As shown, arms 18 are secured to a rib 19 formed on the front of the mold and the outer ends of these arms are provided with sleeves 20 surrounding the shaft 14. Suitable end members 21 are hinged to the front of the mold by means of pins 22. The rear edge of the end members are provided with arms 23 having recesses 24 formed therein and these recesses are adapted to be received in reduced portions 25 of a transverse rod 26, to lock the ends of the mold in position. The apparatus is adapted to mold two blocks at one time and a partition member 27 is arranged in the center of the mold.

The cores are inserted in the molds from the bottom through suitable openings in the bottom plate, and means are provided for inserting the cores and removing them. As shown, the adjacent standards 2 are connected by horizontal members 28 which form bearings for a shaft 29. An eccentric 30 is arranged on this shaft adjacent each end and one end of the shaft is provided with an operating handle 31. Horizontal members 32 and 33 are mounted above and below the eccentric and these horizontal members are adapted to be raised and lowered by the eccentric. They are connected by vertical arms 34 which extend above the upper member and support a platform 35. The cores 36 are adapted to be mounted on this platform. Suitable means are provided for tamping the batch after it has been placed in the mold. As shown, a tamper 37 is mounted on a pivoted lever 38 over the mold. The lever 38 is supported on an upright member 39 carried by a bracket 40, secured to one of the side members 4. A counter weight 41 is arranged on the rear end of the pivoted lever 38. Means are provided for scraping excess material back into the hopper after the molds have been filled. As shown, a leveling rod 42 extends the entire length of the mold and each end of this arm is connected to a rod 43. The rod 43 is provided with slots 44 adapted to receive pins 45 on the sides of the hopper.

After the blocks in the molds have been tamped, a pallet 46 is placed over the mold and locked in position. As shown, an L-shaped clip or bracket 47 is secured to each end of the bottom of the mold and a rod 48 extends through an opening in each of these brackets. This rod is provided with an enlarged head 49, adapted to engage the top of the pallet and a coil spring 50 is arranged on the rod to retain it under tension. The front of the machine is provided with depending arms 51 adapted to support horizontal members 52 upon which the mold is received when it is turned over to the dotted line position shown in Figures 1 and 2 of the drawings. The pallet is then released and the mold returned to its original position, with the molded blocks resting on the pallet.

By providing different shapes of molds, the size and shape of the vent in the block may be varied. As shown, the mold employed is reduced in cross section adjacent the top, as indicated at 53. This forms a block 54, shown in Figure 7 of the drawings, having two spaced vertical vents 55, smaller in cross section at the top 56 than throughout the remainder. The inclined edge 57 formed in the vent provides a convenient hand grip for the mason in laying the block and also gives additional surface for the reception of mortar in laying the block, and therefore insures a better joint.

In the manufacture of smaller blocks, similar in size to clay bricks, we find it sometimes advisable to close the vent at the top, as shown in Figures 8 to 10 of the drawings. In these figures, there is shown a block 58 having suitable vents 59, which are closed at the top, as indicated at 60. When the blocks are laid, they are united by layers of mortar 61 in the usual manner and the mortar works up into the vent opening of the adjacent block, as indicated at 62, thus preventing water from seeping through the joint.

In operation, the batch of material is placed in the hopper 7 and the mold is assembled by fastening the straps 23 to the sides of the mold in the depressions 25 of the bar 26. The core is then arranged within the mold by revolving the cam 30. It will be apparent that the core may be arranged at any desired position within the mold to close or partially close the vent at the top of the block. With the core in the position shown in Figure 3 of the drawings, a block similar to the block shown in Figure 7 is formed. In molding smaller blocks, when it is desired to form a top 60 as shown in Figures 8 to 10 of the drawings, the top of the core is arranged a distance beneath the top of the mold equal to the desired thickness of the top of the block. After the mold has been arranged in place, the material is fed from the hopper to the mold and is then tamped by moving the tamper 37 up and down, the rod 38 swinging on its pivot. When the tamping operation has been completed, excess material is moved back onto the apron 8 by means of the leveling rod 42. The pallet 46 is then placed in position and locked and the entire mold, with the exception of the back 10, is turned over to the dotted line position shown in Figure 3 of the drawings, with the pallet resting upon the horizontal supporting arms 52. The clamps 49 are then released and the mold returned to its normal position, with the molded block resting upon the pallet whence it may be removed to any desired point. Particular attention is called to the fact that any desired type of block may be molded with the ordinary type of pallet by merely changing the core.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. In an apparatus of the character described, a hopper, a mold bottom arranged adjacent said hopper, a pair of arms secured to said mold bottom, a shaft arranged adjacent said mold bottom, the free ends of said arms surrounding said shaft to pivotally support said mold bottom, a front for said mold pivotally connected to said shaft, sides for said mold hinged to said front, means for locking said sides in operative position, and cores adjustably mounted in said mold.

2. A device constructed in accordance with claim 1, wherein said mold is provided with a pallet adapted to be arranged over the mold, and means for retaining said pallet in position.

3. In an apparatus of the character described, a hopper, a pivoted mold arranged adjacent said hopper, a vertically adjustable core support arranged beneath said mold, and means for removing excess material from the top of the mold.

4. In an apparatus of the character described, a hopper, a pivoted mold arranged adjacent said hopper, a vertically adjustable core support arranged beneath said mold, a pivoted lever arranged above said mold, and a tamper carried by said lever.

5. In an apparatus of the character described, a mold having openings formed in the bottom thereof, a core support arranged beneath said mold, cores carried by said support, a cam engaging said core support to permit vertical adjustment of said cores through said openings, a pivoted lever arranged above said mold, and a tamper carried by said lever.

In testimony whereof, we affix our signatures in presence of two witnesses.

EDWARD J. GARVIN.
WALTER T. BARTOL.

Witnesses:
J. L. B. ALEXANDER,
HESS SEAMAN.